United States Statutory Invention Registration [19]

[11] Reg. Number: H740

Gutleber [43] Published: Feb. 6, 1990

[54] ANTENNA SIDELOBE INTERFERENCE CANCELLER

[75] Inventor: Frank S. Gutleber, Little Silver, N.J.

[73] Assignee: The United States of America as represented by the Secretary of the Army, Washington, D.C.

[21] Appl. No.: 374,124

[22] Filed: Jun. 13, 1989

[51] Int. Cl.[4] ..... G01S 3/16

[52] U.S. Cl. ..... 342/384

*Primary Examiner*—Thomas H. Tarcza
*Assistant Examiner*—Linda J. Wallace
*Attorney, Agent, or Firm*—Michael J. Zelenka

[57] ABSTRACT

Interference signal cancelling is provided by a multiplexed interference cancelling system that utilizes a primary high gain antenna and an auxiliary antenna pair including a low gain notch antenna in conjunction with a low gain omnidirectional antenna. The output of the two low gain auxiliary antennas are subtracted from each other to provide an output that is substantially free of all input signals except for the interfering signal received in the narrow notch of the notch antenna. This signal is then subtracted from the composite output signal of the primary antenna. One of these auxiliary antenna pairs is employed for each separate jamming signal source to be cancelled, thus enabling each jamming signal to be orthogonally isolated, whereupon its magnitude and phase is then adjusted to be equal to and 180° out of phase with the same component contained in the composite signal from the primary antenna. Each interfering signal is then separately subtracted from the composite signal, leaving only the desired signal.

15 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTENNA SIDELOBE INTERFERENCE CANCELLER

This is a Statuatory Invention Registration (SIR) application of an invention made by an employee of the U.S. Government, Department of the Army.

CROSS REFERENCE TO RELATED APPLICATION

This invention is related to the invention shown and described in U.S. SIR application Ser. No. 374,123 entitled, "Auxiliary Antenna Interference Canceller", filed by the same assignee in the name of the subject inventor on June 13, 1989.

FIELD OF THE INVENTION

This invention relates to electrical antenna systems for communications and more particularly to an adaptive antenna system which enables undesired interference to be cancelled from the incident radiation received.

BACKGROUND OF THE INVENTION

One of the major concerns of designers of antenna system communication links is the elimination or reduction of external interference sources, such as jamming, self-interference, atmospheric noise, man-made noise and acoustic noise. As is well known, most of the approaches which attempt to resolve these problems of external interference do so in a relatively complex manner, often times utilizing very large directional antennas and/or with antennas having hundreds, or even more, elements. This problem of external interference is particularly prevalent in the area of communication systems where omnidirectional antennas are employed because of the large number of users operating on the same frequency band and because of multi-path. One known approach involves the use of an antenna configuration comprised of an omnidirectional antenna in combination with a notch antenna at the receiving end of a transmission link to cancel interference arriving from all directions except over the narrow notch beamwidth or null formed by the notch antenna where the desired signal emanates. By orthogonally combining the antenna signals from the two antennas, all of the undesired interference is subtracted from the signal received by the omnidirectional antenna, leaving only the desired signal.

One such system is shown and described, for example, in U.S. Pat. No. 4,431,999, entitled, "Interference Cencelling System Using A Notch Antenna And Omnidirectional Antenna", which issued to Frank S. Gutleber, the present inventor, on Feb. 14, 1984. A further illustration of this concept is shown and described in U.S. Pat. No. 4,275,379, entitled, "Interference Cancelling Random Access Discrete Address Multiple Access System", which issued to Frank S. Gutleber on June 23, 1981. The teachings of these patents are specifically incorporated herein by reference.

Accordingly, it is an object of the present invention to provide an improvement in antenna systems having an interference cancelling capability.

It is another object of the invention to provide an improvement in antenna systems having the capability of orthogonally separating and isolating a plurality of simultaneous interference sources and substantially cancelling the signals emanating therefrom.

It is a further object of the invention to provide an antenna system which can cancel or eliminate interference from multiple sources that are offset from antenna boresight and arrive in the sidelobe region or mainlobe of a large high gain antenna.

It is still another object of the invention to provide an antenna system which provides substantial anti-jam protection for transmission links that employ large high gain antennas such as used in a tropospheric, line of sight, or satellite link.

These and other objects are achieved by an approach where adaptive antenna interference cancelling is obtained by the isolation and independent tracking of multiple jammers that are received in a sidelobe region of a primary high gain directive antenna. Each of the interferring signals is orthogonally separated from all of the other interferring signals and then it is directly and separately subtracted from a composite input signal of the desired signal plus all the interference signals received by the high gain antenna. Cancelling the interference does not involve perturbations where the reduction of one interferror can result in increasing the signal of another interferror, nor does it require complex adaptive control algorithms.

The interference cancelling concept of the present invention involves a multiplexed interference cancelling system that utilizes a primary high gain antenna and an auxiliary antenna pair including a low gain notch antenna in conjunction with a low gain omnidirectional antenna. The output of these two relatively simple low gain antenna structures are subtracted from each other to provide an output that is substantially free of all input signals except for the interferring signal received in the narrow notch of the notch antenna. This signal is then subtracted from the composite output signal of the primary antenna. Employing one of these antenna pairs as an auxiliary antenna pair for each separate jamming signal source to be cancelled enables each jamming signal to be orthogonally isolated, whereupon its magnitude and phase is then adjusted to be equal to and 180° out of phase with the same component contained in the composite signal from the primary antenna. Each interfering signal is then separately subtracted from the composite signal, leaving only the desired signal.

BRIEF DESCRIPTION OF THE DRAWINGS

These and other features of the present invention will become readily apparent when the following detailed description of the invention is considered with the accompanying drawings in which.

DETAILED DESCRIPTION OF THE INVENTION

Figure 1:
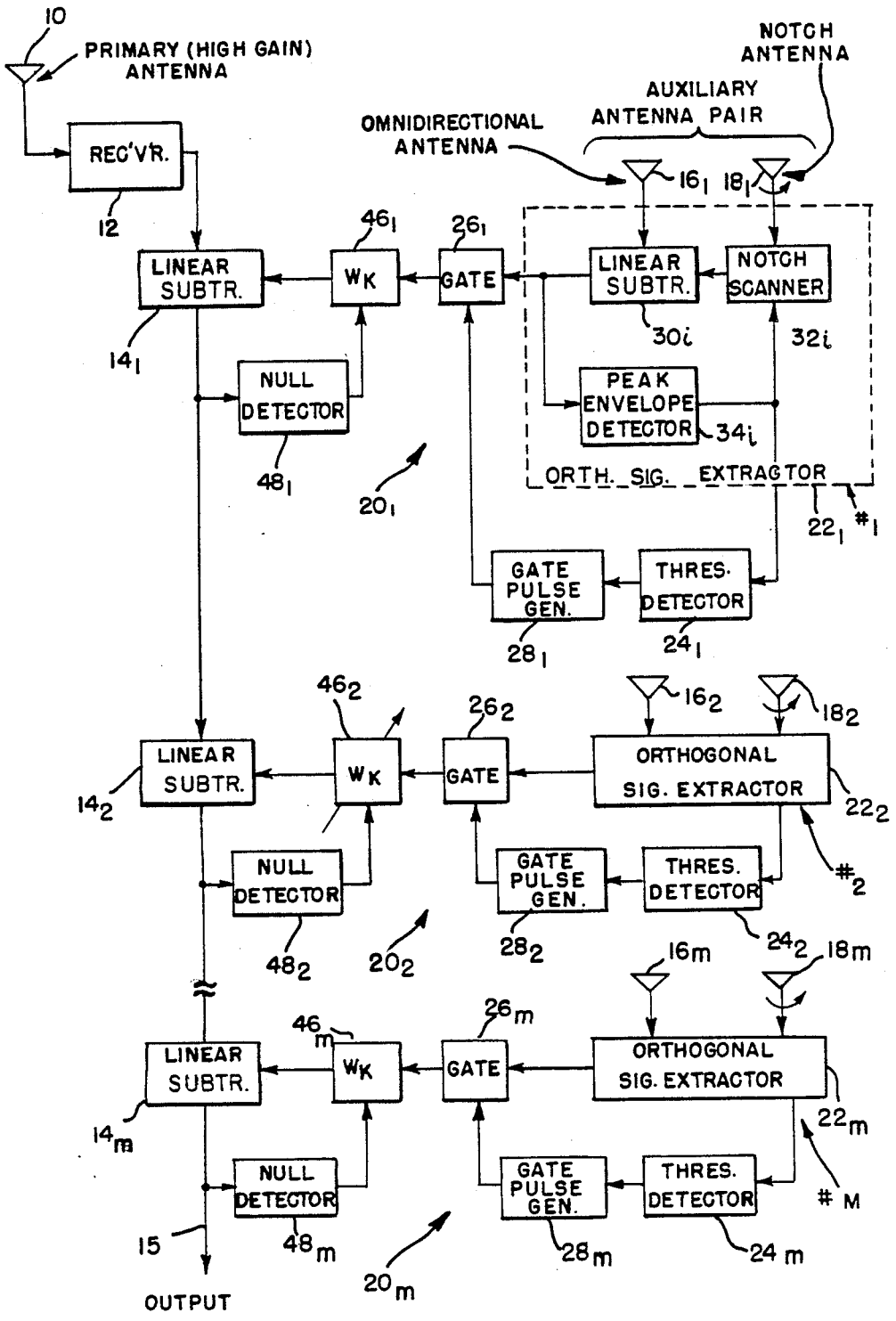
FIG. 1 is an electrical functional block diagram illustrative of the preferred embodiment of the invention.

Referring now to the drawings, reference numeral 10 in FIG. 1 denotes a relatively large, high gain or narrow beamwidth antenna which receives a desired signal $S_d$ in the mainlobe and a plurality(m) of jamming or interferring signals $J_1, J_2 \ldots J_m$. The antenna is connected to a like number m of linear signal subtractors $14_1, 14_2 \ldots 14_m$. The signal subtractors $14_1 \ldots 14_m$ are coupled in series to an output signal line 15. The signal subtractors $14_1 \ldots 14_m$ are also coupled to a respective number of m parallel orthogonal interference signal separators including m pairs of omnidirectional antennas $16_1, 16_2, \ldots 16_m$ and notch antennas $18_1, 18_2, \ldots 18_m$ as well as a respective number of control loops $20_1, 20_2, \ldots 20_m$. Each of the control loops $20_1, 20_2, \ldots 20_m$ includes an orthogonal signal extractor $22_1, 22_2, \ldots 22_m$ having two respective outputs coupled to a threshold detector $24_1, 24_2, \ldots 24_m$ and an output signal gate $26_1, 26_2, \ldots 26_m$, the latter being controlled by a pulse generator $28_1, 28_2, \ldots 28_m$ which is triggered by the output of its respective threshold detector $24_1, 24_2, \ldots 24_m$.

Figure 2:
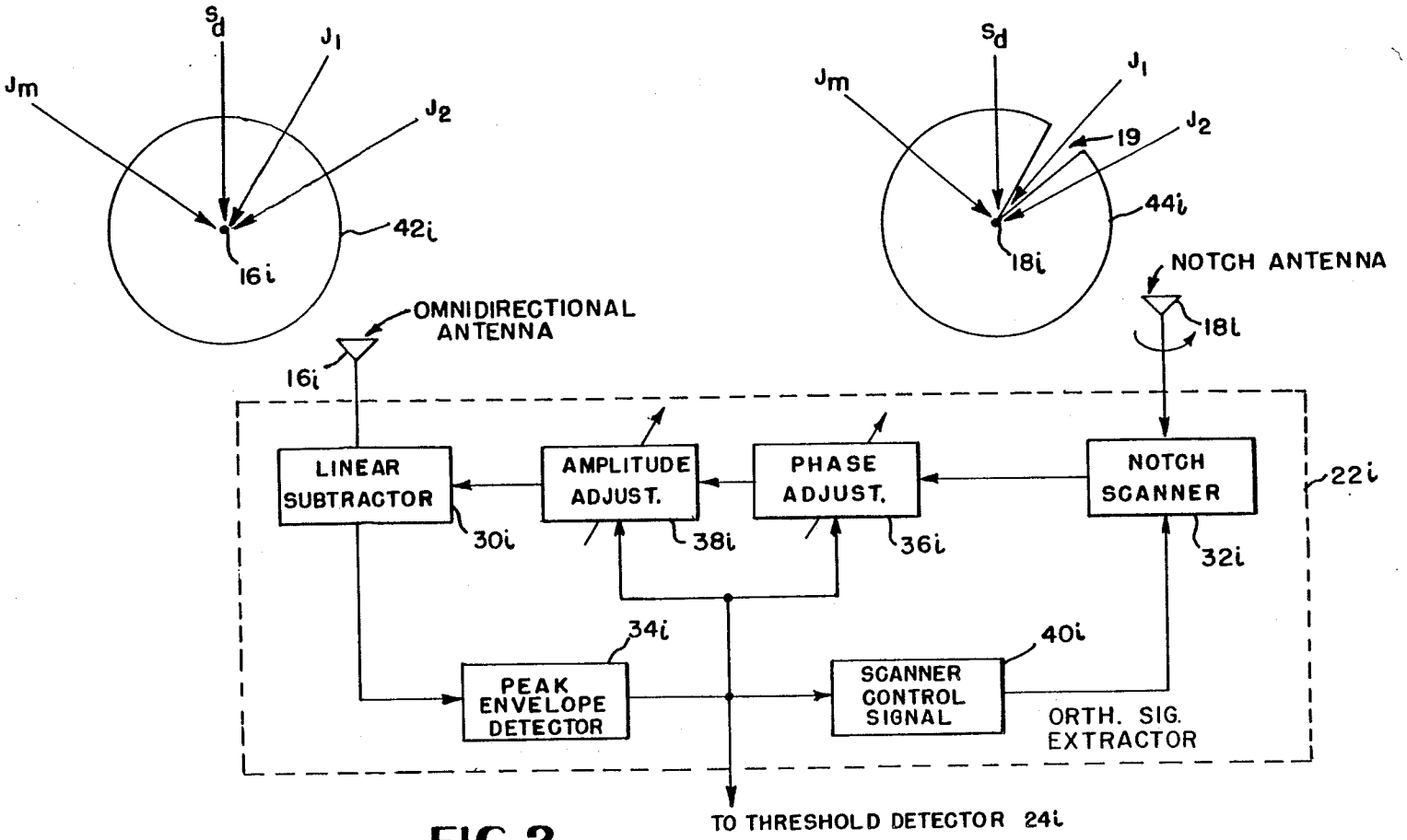
FIG. 2 is an electrical functional block diagram further illustrative of the orthogonal signal extractor shown in FIG. 1.

Each of the orthogonal signal extractors includes circuitry shown in FIG. 2 where the ith signal subtractor $22_i$, for example, in addition to including a linear subtractor $30_i$ connected to the omnidirectional antenna $16_i$, a notch scanner $32_i$ connected to the notch antenna $18_i$ and a peak envelope detector $34_i$ as shown in the extractor circuit $22_1$ shown in FIG. 1, also includes separate phase and amplitude adjusting circuit $36_i$ and $38_i$ coupled between the output of the notch scanner $32_i$ and the linear subtractor $30_i$ as well as a control signal circuit $40_i$ connected between the output of the peak envelope detector $34_i$ and the notch scanner $32_i$. The output of the peak envelope detector $34_i$ is also fed to a respective threshold detector circuit $24_i$ of FIG. 1.

Further as shown in FIG. 2, are top plan view diagrams generally illustrative of the antenna patterns $42_i$ and $44_i$ of the omnidirectional antenna $16_i$ and the notch antenna $18_i$, respectively. Also shown are the directions from which the desired signal $S_d$ and a plurality of interfering signals $J_1$, $J_2$ and $J_m$ are incident on the antennas 16 and 18, as well as the primary 10 shown in FIG. 1.

Each pair of auxiliary antennas $16_i$ and $18_i$ are used to isolate and track one specific jamming signal $J_i$ by cancelling all of the signals except the one that is being tracked. Assuming that $i=1$ and the position of the notch 19 in antenna $18_i$ is scanned via the scanner $32_i$ until it is pointing in the direction of one of the jamming signals, e.g. $J_1$, then the output of the antenna $18_i$ contains the desired signal $S_d$ plus all of the remaining interfering signals, i.e. $J_2$ and $J_m$.

The output of the antenna $18_i$ contains a coherent and correlated replica of the desired signal—plus—interference but minus $J_1$. This output is then directly subtracted from the signal received by the omnidirectional antenna $16_i$ following its phase and amplitude being adjusted via the circuits $36_i$ and $38_i$ to provide a coherent and co-related replica of the jamming signal $J_1$. The subtraction operation is performed in the linear subtractor $30_i$ which as shown is fed to the peak envelope detector $34_i$ and the threshold detector $24_1$. The peak envelope detector $34_i$ and the scanner control signal generator $40_i$ provide a means for tracking the interfering signal $J_1$ in a well known manner.

The operations associated with each of the auxiliary antenna pairs $16_1, 16_2, \ldots 16_m$ and $18_1, 18_2, \ldots 18_m$ is further clarified as follows. The resultant signal $S_{TN}$ out of the notch antenna $18_i$ is comprised of:

$$S_{TN}=J_2+J_3 \ldots +J_m+S_d$$

where $J_i$ is the ith interfering jamming signal and $S_d$ is the desired signal. Therefore, $$S_{TN} = S_d + \sum_{i=2}^{N} J_i$$

The output $S_{TO}$ of the omnidirectional antenna $16_i$ consists of a coherent replica of the same signals as that of the notch antenna plus the jamming interference signal $J_1$. Thus:

$$S_{TO} = S_d + \sum_{i=1}^{N} J_i.$$

The output of the linear subtractor $30_i$ of the ith stage then provides an exclusive coherent replica of the jamming interference signal $J_i$. Where $i=1$, the $J_1$ interference signal would be fed from the linear subtractor $30_1$ to the gate circuit $26_1$ of the first cancelling stage shown in FIG. 1. The gate circuit $26_1$ is enabled when the output of the threshold detector $24_1$ reaches a predetermined amplitude level, at which time the gate pulse generator $28_1$ produces a gate pulse that is fed to the gate at $26_1$, causing the interfering signal $J_1$ to be transferred to a functional block $46_1$ and then to the linear subtractor $14_1$.

Signal block $46_1$ contains means for adjusting both the amplitude and phase of the signal $J_1$ similar to the circuits $36_i$ and $38_i$ shown in FIG. 2 to become equal to but opposite in phase to the signal $J_1$ contained in the composite signal $S_{TO}$ out of the receiver 12 containing the desired signal $S_d$ and all of the interfering signals $J_1, J_2, \ldots J_m$. The amplitude and phase output from the functional block $46_1$ is further controlled by a null detector $48_1$ which is coupled to the output of the linear subtractor $14_1$. Thus it can be seen that the amplitude and phase of the interfering signal $J_i$ is adjusted in a servo loop context until the output of the null detector is substantially zero, meaning that $J_1$ has been removed from the composite signal from the primary antenna 10.

Each of the succeeding stages 2, 3, . . . m as shown in FIG. 1 operate in the same manner until all the m interfering signals $J_m$ are removed from the output signal appearing on circuit lead 15.

The notch antenna 18 comprises one of the most important elements in the subject invention and introduces different requirements than normally encountered in an antenna design. Instead of involving a configuration which forms a directive beam with sidelobes, or utilizing an adaptive system with several movable nulls, a fixed pattern which contains a uniform reception in all directions except for a narrow beam slot is involved. In addition, the slope of the antenna pattern at the point of the null is to be as steep as possible. Such a required pattern is illustratively shown in FIG. 3.

Figure 3:
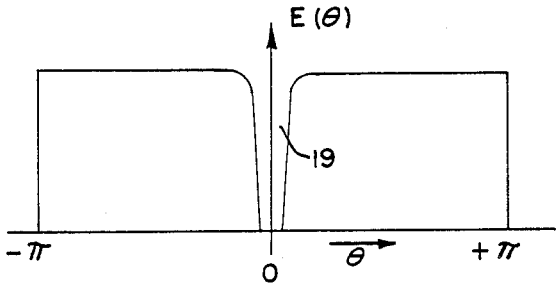
FIG. 3 is a simplified illustration of an antenna pattern of a notch antenna used in the embodiment of the invention shown in FIG. 1.

General design procedures for providing an array antenna having the type of pattern shown in FIG. 3 are described in U.S. Pat. Nos. 3,130,410; 3,605,106; and 4,580,141. As noted therein, such patterns are made up of products and/or sums of sin mx/sin x functions, and can be achieved by controlling both the amplitudes and spacings of array antenna elements. As a result, the slope of a null in an antenna beam pattern can be made steep, either by providing products of one or more sin mx/sin x terms, or by appropriate amplitude and phase controls when summing several sin mx/sin x functions using subarrays. Further explanation can be had by referring to a publication entitled, "Coded Linear Array Antenna", published in volume 39, No. 2, of *Electrical Communications Magazine.*

Figure 4:
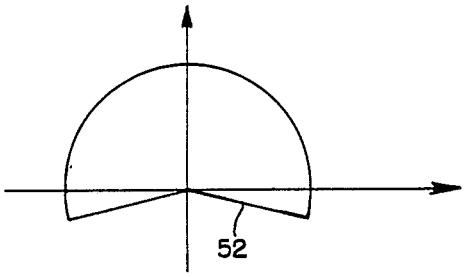
FIGS. 4 and 5 are simplified top plan views of an alternative antenna pattern and resultant beam processing applicable to a modification of the interference cancelling system of FIG. 1.
Figure 5:
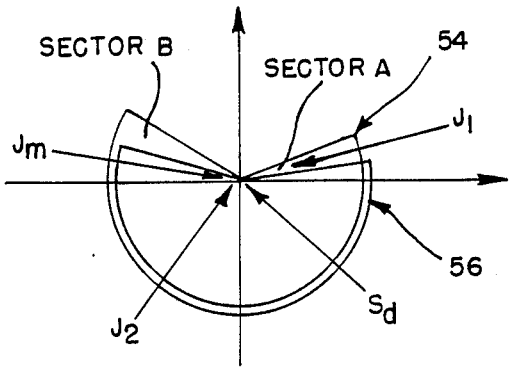

If some antenna gain is necessary for the auxiliary antennas 16 and 18 in order to obtain a received jamming signal level comparable to the level arriving in the sidelobe of the primary antenna in addition to being at a stronger level than the input noise, then an alternate method can be used that is essentially based upon the same principle by using a higher gain auxiliary antenna that has a steep slope, but with a somewhat wider nulled beamwidth as shown by reference numeral 52 in FIG. 4. With this version, the antenna pattern can be electronically scanned to provide a second received beam which is angularly displaced by a small amount, as shown in FIG. 5. There two received beams 54 and 56 can then be positioned so that the desired signal $J_1$ to be orthogonally isolated, is near the edge of one receiving beam 54, while being nulled out by the second receiving beam 56 as shown. The two received beams 54 and 56 would then provide inputs to the linear subtractor $\mathbf{30}_1$ in a manner analogous to using a notch in an omnidirectional pair. This alternate arrangement introduces a second sector (sector B) which would prevent isolation of an interfering signal received in section A, if two interfering sources were simultaneously present in both sector A and sector B. The possibility of this occurring, however, could be made extremely small by making the sector beamwidth and the non-overlapped region therebetween extremely small.

The antenna sidelobe cancelling technique described herein can be used to provide significant ECCM protection in any communication link that operates with a high gain, narrow beamwidth antenna such as an LOS, Tropo, or satellite link that operates in the SHF or EHF frequency band. The inventive concept, moreover, can be added directly to an existing system as a retrofit that employs a large parabolic dish antenna and has the potential of providing a substantial amount of A/J protection.

The primary advantage of the present invention over the known prior art is that it has the capability of orthogonally separating and isolating many different sidelobe interferrors simultaneously to facilitate attenuating all of them so that they are substantially totally eliminated and is accomplished with a relatively simple auxiliary antenna structure and a nominal amount of signal processing. In addition, the response or acquisition time for the proposed system is extremely fast in a relative sense, since the various loops would be simultaneously processing the output of the primary antenna in parallel and the processing does not involve complex, time consuming adaptive control algorithms such as the least mean square (LMS) or power inversion algorithms.

Thus the orthogonal signal separator for each interference cancelling control loop isolates one of the m different jamming signals whose phase and amplitude is then adjusted to be of equal strength and opposite sense to the same jamming signal that is present in the composite output of the main or primary antenna 10. The simple linear subtraction of the adjusted output of the auxiliary antenna pair 16, 18 from the output of the main antenna 10 then completely cancels the interference of the specific isolated jammer. Each of the remaining m-1 jamming signals are cancelled in an identical manner using a separate null tracking loop for each jamming or interference signal.

Having thus shown and described what is at present considered to be the preferred embodiment of the invention, it should be noted that the same has been made by way of illustration and not limitation. Accordingly, all alterations, changes and modifications coming within the spirit and scope of the invention are herein meant to be included.

I claim:

1. An antenna sidelobe interference cancelling system, comprising:

primary receiving antenna means including an output for providing a first output signal including a desired signal and all of a plurality of interfering signals;

at least one auxiliary receiving antenna pair including omindirectional antenna means and steerable notch antenna means, said notch antenna means including a notch in the radiation pattern thereof directed to one of said interfering signals;

first circuit means connected to the respective outputs of said auxiliary antenna pair and differencing the output signals generated thereby to generate a second output signal corresponding to said one interfering signal; and second circuit means connected to the output of said primary antenna means and said first circuit means for subtracting said second output signal from said first output signal and generating a control output signal.

2. The system of claim 1 wherein said at least one auxiliary antenna pair comprises a plurality of auxiliary antenna pairs each including respective omnidirectional antenna means and steerable notch antenna means, said plurality of notch antenna means being directed to selected different ones of said interfering signals, wherein said first circuit means comprises a like plurality of first circuit means respectively connected to said auxiliary antenna pairs for generating a respective number of second output signals, and wherein said second circuit means subtracts all of said second output signals from said first output signal.

3. The system of claim 2 wherein said plurality of auxiliary antenna pairs are at least equal in number to the number of said plurality of interfering signals.

4. The system of claim 2 wherein said second circuit means includes means for subtracting each of said second output signals individually from said first output signal.

5. The system of claim 4 and additionally including means for adjusting the amplitude and phase of the respective second output signals to match corresponding interfering signals in said first output signal from said primary antenna means.

6. The system of claim 5 and additionally including means for adjusting the amplitude and phase of said second output signals in response to the control output signal of said second circuit means.

7. The system of claim 6 wherein said means for adjusting the amplitude and phase of said second output signals comprises null detector means.

8. The system of claim 4 wherein said means for subtracting each of said second output signals of said second circuit means includes a respective number of linear subtractor means connected in series for subtracting each of said second output signals individually from said first output signal.

9. The system of claim 4 wherein each of said first circuit means further comprises orthogonal signal extractor means including linear subtractor means including an output coupled to the outputs of said auxiliary antenna pair.

10. The system of claim 9 wherein each said signal extractor means additionally includes, notch scanner circuit means coupled to respective said notch antenna means, and peak envelope detector means coupled between the output of said linear subtractor means and said notch scanner circuit means for causing the notch in the radiation pattern of said respective antenna means to track a respective one of said interfering signals.

11. The system of claim 10 wherein each said signal extractor means additionally includes signal amplitude and phase adjusting means coupled between the output said respective notch antenna means and said linear subtractor for causing the output of said respective notch antenna means to match the output of said omnidirectional antenna.

12. The system of claim 10 and additionally including signal gate circuit means coupled between each said linear subtractor means and each said second circuit means, and means responsive to the amplitude of the output of said respective notch antenna means for enabling said gate circuit means when said output reaches a predetermined amplitude.

13. The system of claim 12 wherein said means responsive to amplitude comprises a threshold detector.

14. The system of claim 13 and additionally including gate pulse generator means coupled between said threshold detector and said gate circuit means for generating an enabling pulse for said gate circuit means in response to the output of said threshold detector.

15. The system of claim 14 and additionally including means for adjusting the amplitude and phase of the respective second output signals to match corresponding interfering signals in said first output signal from said primary antenna means.

* * * * *